(No Model.)

T. J. FINCHER & W. BYERS.
PLANTER.

No. 468,335.  Patented Feb. 9, 1892.

Witnesses
Jas. K. McCathran
W. S. Duvall

Inventors
Thomas J. Fincher
William Byers

By their Attorneys,
C. A. Snow & Co.

UNITED STATES PATENT OFFICE.

THOMAS J. FINCHER AND WILLIAM BYERS, OF IRONDALE, ALABAMA.

PLANTER.

SPECIFICATION forming part of Letters Patent No. 468,335, dated February 9, 1892.

Application filed June 11, 1891. Serial No. 395,914. (No model.)

*To all whom it may concern:*

Be it known that we, THOMAS J. FINCHER and WILLIAM BYERS, citizens of the United States, residing at Irondale, in the county of Jefferson and State of Alabama, have invented a new and useful Planter, of which the following is a specification.

This invention has relation to improvements in planters; and the objects in view are to provide a cheap and simple construction of planter adapted to be automatically and intermittently operated when moved along a furrow and to open, roll, and subsequent to the dropping of the seed close the furrow.

Other objects and advantages of the invention will appear in the following description, and the novel features thereof will be particularly pointed out in the claims.

Figure 1:
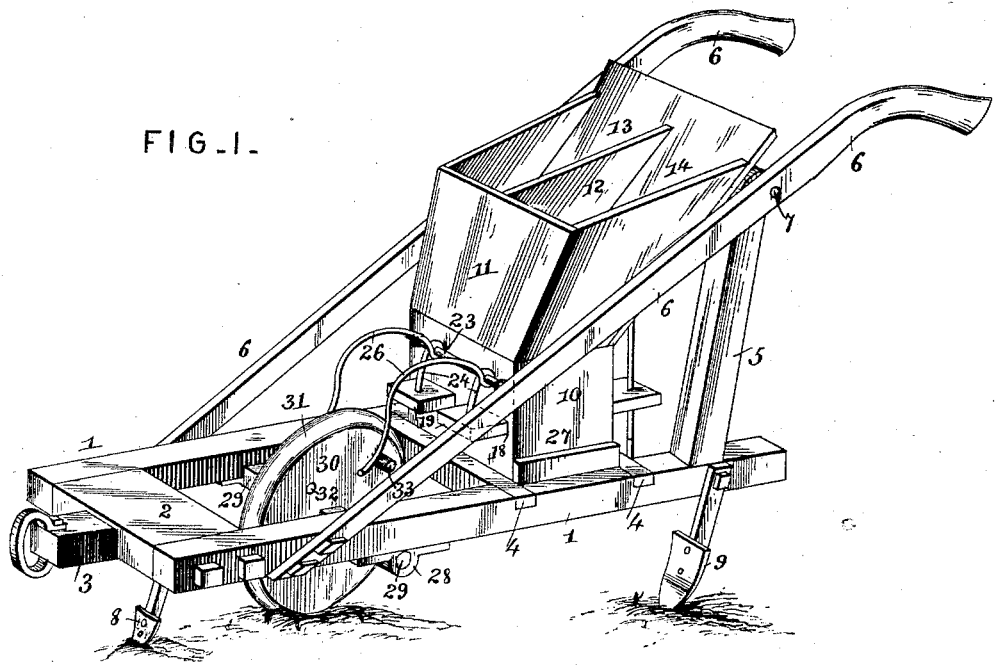
Figure 2:
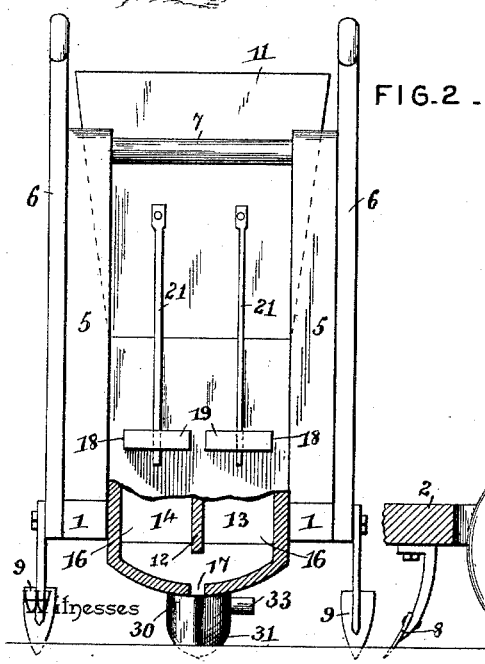
Figure 3:
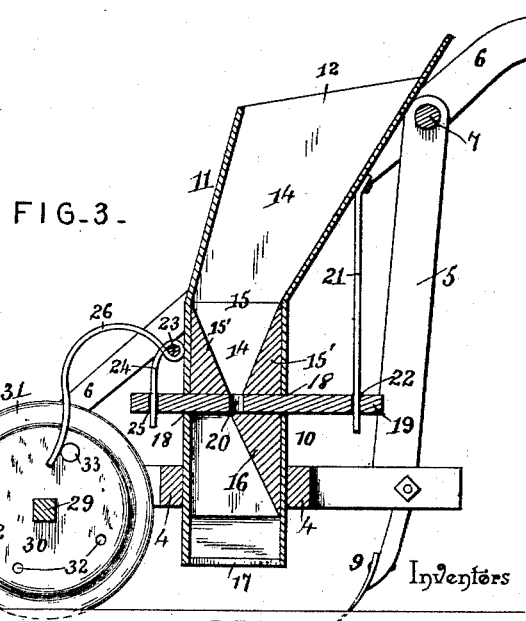

Referring to the drawings, Figure 1 is a perspective of a seeder or planter constructed in accordance with our invention. Fig. 2 is a rear elevation. Fig. 3 is a longitudinal section.

Like numerals of reference indicate like parts in all the figures of the drawings.

1 designates the opposite side bars of the planter-frame, and the same are connected at their front ends by the transverse bar 2, from which extends the draft-beam 3. Near their rear ends a pair of transverse bars 4 connect the side bars 1, and in rear of these rise the standards 5, to which are secured the upper ends of a pair of handles 6 by means of a cross-pin 7, the lower ends of the handles being bolted to the side bars 1. From the cross-piece 2 depends the front furrow-opening shovel or plow 8, and from the bars 1, at the rear ends of the same, depend the covering shovels or standards 9. Between the bars 4 and 1 there is mounted a seed-box 10, and upon the same a hopper 11, which, by means of a partition 12, is divided into compartments 13 and 14. The bottoms of the hoppers are provided with openings 15, which empty into the seed-box, which is in a like manner divided into compartments 13 and 14 by means of a continuation of the partition 12. Each of the compartments of the seed-box has secured to its front and rear walls a pair of diagonally-oppositely-inclined blocks 15' and is provided with a bottom section 16, the two sections of the two compartments nearly meeting at their inner edges and leaving a seed-slot 17, through which the seed may make their exit when dropped from the hopper to the seed-box.

Openings 18 are formed in the front and rear walls of the seed-box, directly in line with the spaces between the pairs of blocks 15, and in each pair of openings is mounted a seed-slide 19, said slides being provided with a perforation 20, normally maintained over the rear inclined blocks 16 by means of depending spring-rods 21, connected at their upper ends to the rear inclined wall of the hopper and passing through perforations 22 in the rear ends of the slide, whereby they are in position to receive seed and to deliver the same to the bottom of the seed-box when drawn to the front, so that their perforations are no longer covered by the rear blocks 16.

A shaft 23 is secured to the front face of the seed-box immediately above the slides, and around the same and above each slide is coiled a spring-rod 24. One terminal of each rod depends into and passes through a perforation 25, while the remaining terminal is forwardly bent to form a spring-arm 26.

The seeding apparatus may be withdrawn when the plow is alone to be used, and is mounted in position, as before stated, between the cross-bars 4 and side bars 1, the cleats 27 being secured to the seed-box and resting on the side beams to form a support.

Bearings 28 are located upon the under sides of the side beams 1 between the forward cross-bars 4 and 2, and in said bearings is mounted a shaft 29, made square and carrying at its center a wheel 20. The wheel 20 is preferably solid and is provided with a wide rounded tread or periphery 31. The opposite faces of the wheel are each provided with a series of concentric perforations 32, in any one of which may be inserted, removably, a laterally-projecting pin 33.

This completes the construction, and the operation, although readily understood from the foregoing description, may be briefly stated as follows: As the machine is drawn along the front plow 8 opens the furrow, while the rounded wheel, following in rear thereof, packs or rolls the same. The pins at the opposite sides of the wheel act alternately upon the pair of spring-arms pivoted to the seed-box, and they operate the depending arms so as to withdraw alternately the seed-slides, each dropping a seed, as heretofore explained, and being returned to position for a subsequent seed by means of the depending spring-rods 21 after the pins have passed beyond the spring-arms and ceased to influence the same. The side plows 9, following behind the seeder, shovel the dirt back into the furrow, thus covering the freshly-planted seeds.

It will be obvious that various seed-plates may be substituted for those herein shown, and thus the machine is adapted for sowing various seeds. By means of the double hopper and mechanism therefor guano and other fertilizing agents may be sowed with the seed.

Having described our invention, what we claim is—

1. In a planter of the class described, the combination, with the frame-work, the axle, the wheel mounted thereon and having at opposite sides a concentric series of openings, and pins removably mounted in the openings, of a hopper provided with a central partition forming the same into opposite compartments, a seed-box below the hopper, having a slotted bottom, oppositely-disposed triangular blocks located upon the inner sides of the walls of the compartments of the box, seed-slides passed between the box and extending beyond the front and rear walls thereof, spring-rods depending from the hopper at the rear side thereof and passing through perforations in the rear ends of the slides, a cross-bar located in front of the hopper, and spring-rods coiled about the shaft intermediate their ends and above the slides, one terminal of each rod passing through the perforation in the front end of the slide and the remaining terminal forwardly extended to form a spring-arm and adapted to be struck by the pins of the wheel, substantially as specified.

2. In a seeder, the combination, with a seed-box provided at its front and rear walls with diagonally-oppositely-disposed triangular blocks spaced apart and in alignment with openings formed in the front and rear walls of the seed-box, of a seed-slide mounted in the openings, a spring for withdrawing the perforation of the slide over the inverted angle-block, and means for intermittently withdrawing the slide from over such opening, substantially as specified.

In testimony that we claim the foregoing as our own we have hereto affixed our signatures in presence of two witnesses.

THOMAS J. FINCHER.
WILLIAM BYERS.

Witnesses:
JOHN D. STRANGE,
JO. G. CREWS.